(12) United States Patent
Song (10) Patent No.: US 12,326,848 B2
(45) Date of Patent: Jun. 10, 2025

(54) SYSTEM, METHOD AND COMPUTER READABLE STORAGE MEDIUM FOR PARTITIONING KEYSPACE

(71) Applicant: SAMSUNG SDS CO., LTD., Seoul (KR)

(72) Inventor: Jihun Song, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/384,666

(22) Filed: Oct. 27, 2023

(65) Prior Publication Data

US 2024/0143571 A1     May 2, 2024

(51) Int. Cl.
*G06F 16/22*    (2019.01)
*G06F 16/2455*  (2019.01)

(52) U.S. Cl.
CPC .... *G06F 16/2282* (2019.01); *G06F 16/24554* (2019.01)

(58) Field of Classification Search
CPC ........................ G06F 16/2282; G06F 16/24554
See application file for complete search history.

(56) References Cited

U.S. PATENT DOCUMENTS

| | | |
|---|---|---|
| 9,280,570 B2 | 3/2016 | Pruner |
| 10,078,682 B2 | 9/2018 | Tan et al. |
| 10,394,847 B2 | 8/2019 | Stringham |
| 10,769,111 B2 | 9/2020 | Bailey et al. |
| 2013/0332484 A1* | 12/2013 | Gajic ............ G06F 16/285 707/E17.014 |
| 2017/0139910 A1 | 5/2017 | Mcalister et al. |
| 2017/0357687 A1 | 12/2017 | Bulkowski et al. |
| 2018/0101399 A1 | 4/2018 | Jain et al. |
| 2019/0102418 A1* | 4/2019 | Vasudevan ........ G06F 16/27 |
| 2020/0287830 A1* | 9/2020 | Capper .......... H04L 67/1001 |
| 2021/0334282 A1 | 10/2021 | Srinivasan et al. |
| 2022/0335027 A1* | 10/2022 | Subramanian Seshadri ......... G06F 16/24573 |

FOREIGN PATENT DOCUMENTS

| | | |
|---|---|---|
| CN | 111290710 A | 6/2020 |
| WO | 2022/220830 A1 | 10/2022 |

OTHER PUBLICATIONS

Data Stax, "Apache Cassandra™ 1.2 Documentation", Jan. 13, 2013, 201 pages, XP055142834.
Elahe Khatibi et al., "A dynamic data dissemination mechanism for Cassandra NoSQL data store", The Journal of Supercomputing, vol. 75, Jul. 29, 2019, pp. 7479-7496, XP036941339, DOI: 10.1007/s11227-019-02959-7.

(Continued)

*Primary Examiner* — Loc Tran
(74) *Attorney, Agent, or Firm* — Sughrue Mion, PLLC (57) ABSTRACT

A system for partitioning a keyspace includes: a system for partitioning a keyspace, includes: a server configured to transmit a partition setting item based on a keyspace creation request; and a database configured to receive the partition setting item and configured to create a first partition for the keyspace based on the received partition setting item, wherein the partition setting item includes a replication factor and at least one of a size of a second partition for storing data or a storage period of the data.

13 Claims, 7 Drawing Sheets

(56) References Cited

OTHER PUBLICATIONS

Communication issued on Mar. 12, 2024 by the European Patent Office for European Patent Application No. 23205165.6.

Subramanian Hariharan, "Using Docker to Create a Cassandra Cluster", Analytics Vidhya, Data Science Blogathon, Sep. 2, 2022, 8 pages.

Overview, Apache Cassandra, Aug. 28, 2020, 4 pages, https://cassandra.apache.org/doc/trunk/cassandra/architecture/overview.html.

"Monitoring Cassandra with Prometheus", Prometheus Cassandra, May 17, 2020, 12 pages, https://www.cloudwalker.io/2020/05/17/monitoring-cassandra-with-prometheus/.

Monitoring, Apache Cassandra, Aug. 28, 2020, 66 pages, https://cassandra.apache.org/doc/latest/cassandra/operating/metrics.html.

Jimmy Guerrero, "Apache Cassandra DB Architecture Fundamentals", Aug. 9, 2018, 5 pages, https://www.yugabyte.com/blog/apache-cassandra-architecture-how-it-works-lightweight-transactions/.

Vector Database for Production-level Gen AI, DataStax, 2023, 7 pages, DataStax.com.

Communication issued on Oct. 1, 2024 by the European Patent Office for EP Patent Application No. 23205165.6.

\* cited by examiner

SYSTEM, METHOD AND COMPUTER READABLE STORAGE MEDIUM FOR PARTITIONING KEYSPACE

CROSS-REFERENCE TO RELATED APPLICATION(S)

This application is based on and claims priority under 35 U.S.C. § 119 to Korean Patent Application No. 10-2022-0141732, filed on Oct. 28, 2022, in the Korean Intellectual Property Office, the disclosure of which is incorporated by reference herein in its entirety.

BACKGROUND

1. Field

The disclosure relates to a system, method and computer readable storage medium for partitioning of a keyspace.

2. Description of the Related Art

Cassandra is a distributed database based on Apache open source. Unlike existing relational databases, Cassandra is a NoSQL database not using Structured Query Language (SQL), and thus, has the advantage of being able to process large amounts of transactions quickly.

Basically, Cassandra has a structure in which a number of nodes are connected in a ring form, and has data distributed and stored in respective nodes. In this case, since the storage capacity per node is recommended to be, for example, 1 terabyte, there may be a problem in that resources such as disks and the like should be added or replaced whenever the storage capacity is exceeded.

SUMMARY

Provided are a system, method and computer readable storage medium for partitioning of a keyspace, in which storage capacity may be efficiently managed and a problem of recommended storage capacity of nodes may be resolved.

According to an aspect of the disclosure, a system for partitioning a keyspace, includes: a server configured to transmit a partition setting item based on a keyspace creation request; and a database configured to receive the partition setting item and configured to create a first partition for the keyspace based on the received partition setting item, wherein the partition setting item includes a replication factor and at least one of a size of a second partition for storing data or a storage period of the data.

In some embodiments, the server is configured to request a registration of a cloud service based on an event to a cloud-service-providing device, and wherein the cloud-service-providing device is configured to store the cloud service requested for the registration.

In some embodiments, based on the event being a first event, in which a first access frequency is lower than a preset access frequency, the cloud service is configured to provide a first command for reducing the replication factor to the database, wherein, based on the event being a second event, in which the storage period of the data has elapsed, the cloud service is configure to provide a second command to delete the data for which the storage period has elapsed to the database, and wherein, based on the event being a third event, in which a data usage compared to the size of the partition is a predetermined ratio or more, the cloud service is configured to provide a third command to additionally create a third partition for storing the data to the database.

In some embodiments, the server is further configured to: monitor a second access frequency of the data stored in the partition and a magnitude of the data stored in the partition, and transmit an event alarm including at least one of the first event, the second event, or the third event based on a monitoring result to the cloud-service-providing device.

In some embodiments, the cloud-service-providing device is configured to, based on the event alarm, provide the cloud service according to at least one of the first event, the second event, or the third event to the database in an event-triggered manner.

In some embodiments, the partition setting item further includes a name of the keyspace, a time stamp, and a storage period, and wherein the partition setting item is stored as a JavaScript Object Notation (JSON) file.

According to an aspect of the disclosure, a method of partitioning a keyspace, the method includes: transmitting, in a server, a partition setting item based on a keyspace creation request; and receiving, in a database, the partition setting item and creating a first partition for the keyspace based on the received partition setting item, wherein the partition setting item includes a replication factor and at least one of a size of a second partition for storing data or a storage period of the data.

In some embodiments, the method further includes: requesting, in the server, a registration of a cloud service based on an event to a cloud-service-providing device; and storing, in the cloud-service-providing device, the cloud service requested for the registration.

In some embodiments, based on the event being a first event, in which a first access frequency is lower than a preset access frequency, the cloud service is configured to provide a first command for reducing the replication factor to the database, based on the event being a second event, in which the storage period of the data has elapsed, the cloud service is configured to provide a second command to delete the data for which the storage period has elapsed to the database, and based on the event being a third event, in which a data usage compared to the size of the partition is a predetermined ratio or more, the cloud service is configured to provide a third command to additionally create a third partition for storing the data to the database.

In some embodiments, the method further includes: monitoring, in the server, a second access frequency of the data stored in the partition and a magnitude of the data stored in the partition; and transmitting, by the server, an event alarm including at least one of the first event, the second event, or the third event based on a result of the monitoring to the cloud-service-providing device.

In some embodiments, the method further includes: providing, by the cloud-service-providing device based on the event alarm, the cloud service according to at least one of the first event, the second event, or the third event to the database in an event-triggered manner.

In some embodiments, the partition setting item further includes a name of the keyspace, a time stamp, and a storage period, and wherein the partition setting item is stored as a JavaScript Object Notation (JSON) file.

According to an aspect of the disclosure, a non-transitory computer-readable recording medium storing computer program, which, when executable by at least one processor, causes the at least one processor to execute: transmit, in a server, a partition setting item based on a keyspace creation request; and receive, in a database, the partition setting item and creating a first partition for a keyspace based on the received partition setting item, wherein the partition setting item includes a replication factor and at least one of a size of a second partition for storing data or a storage period of the data.

BRIEF DESCRIPTION OF DRAWINGS

The above and other aspects, features, and advantages of the disclosure will be more clearly understood from the following detailed description, taken in conjunction with the accompanying drawings, in which.

DETAILED DESCRIPTION

Hereinafter, embodiments of the disclosure will be described with reference to the accompanying drawings. However, the embodiment may be modified in many different forms, and the scope of the disclosure is not limited only to the embodiments described below. The shapes and sizes of elements in the drawings may be exaggerated for clearer explanation. Elements indicated by the same reference numerals in the drawings are the same elements.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

First, in the disclosure, Cassandra is a distributed database based on Apache open source, and unlike existing relational databases, Cassandra is a NoSQL database that does not use Structured Query Language (SQL). Cassandra basically has a structure in which a number of nodes are connected in a ring form, and data may be distributed and stored in respective nodes.

Also, in the disclosure, keyspace partitioning refers to creating partitions in units of keyspaces within the storage space (disk) of a database or managing partitions in units of created keyspaces.

Hereinafter, the server used in Cassandra will be described as an example, and the database used in Cassandra will be described as an example.

Figure 1:
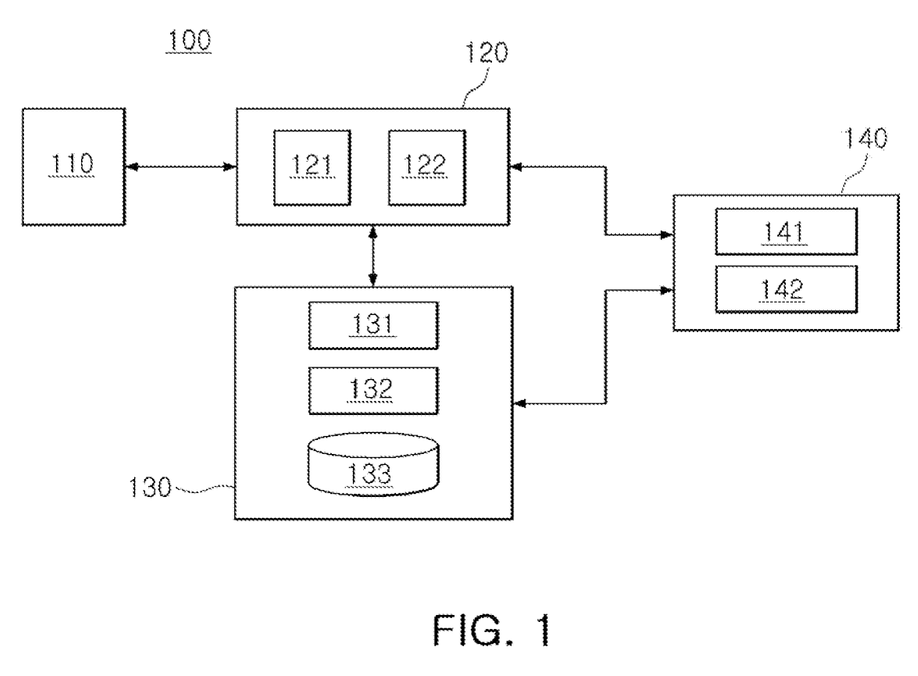
FIG. 1 is a block diagram of a system for partitioning a keyspace according to an embodiment.

FIG. 1 is a block diagram of a system 100 for partitioning a keyspace according to an embodiment, and the system 100 may include an administrator terminal 110, a server 120, a database 130, and a cloud service providing device 140.

Figure 2:
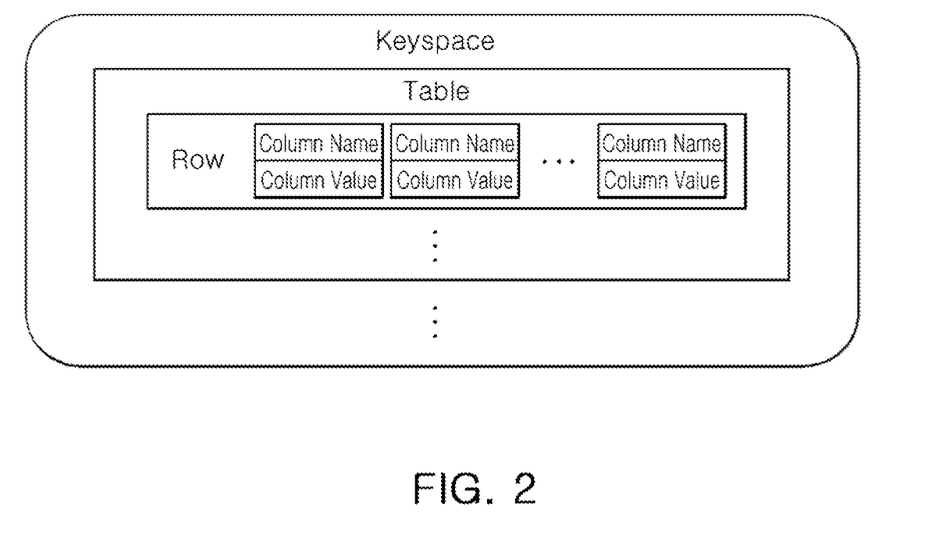
FIG. 2 is a diagram illustrating the keyspace used in Cassandra.

On the other hand, FIG. 2 is a diagram illustrating the keyspace used in Cassandra.

Figure 3A:
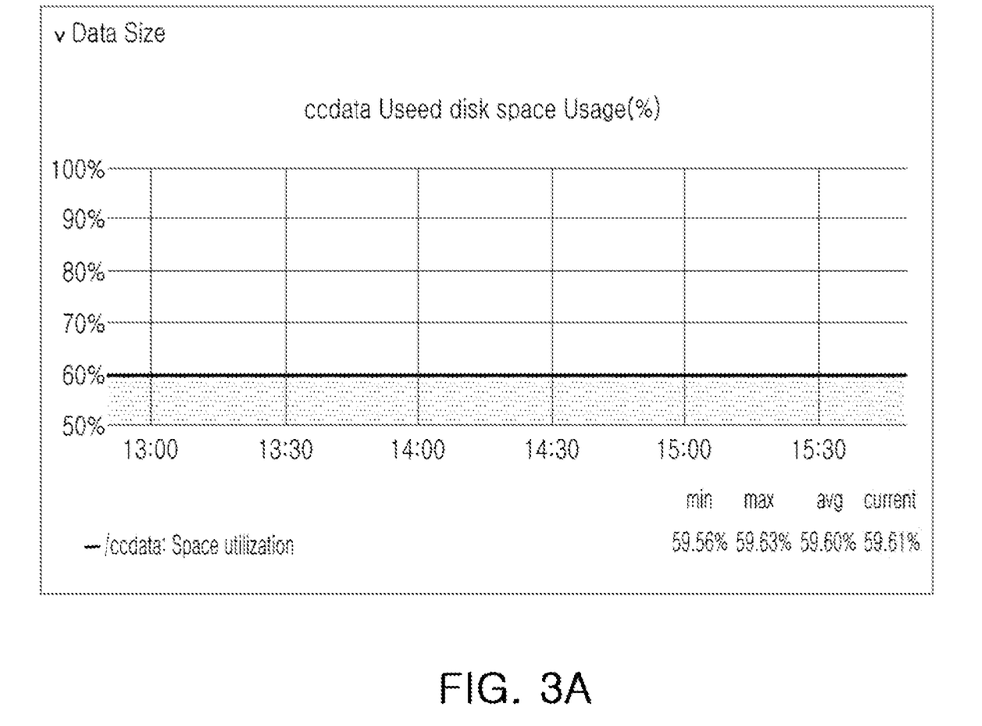
FIGS. 3A to 3C are diagrams illustrating monitoring results using Java Management eXtensions (JMX), an open Application Programming Interface (API), according to an embodiment.
Figure 3B:
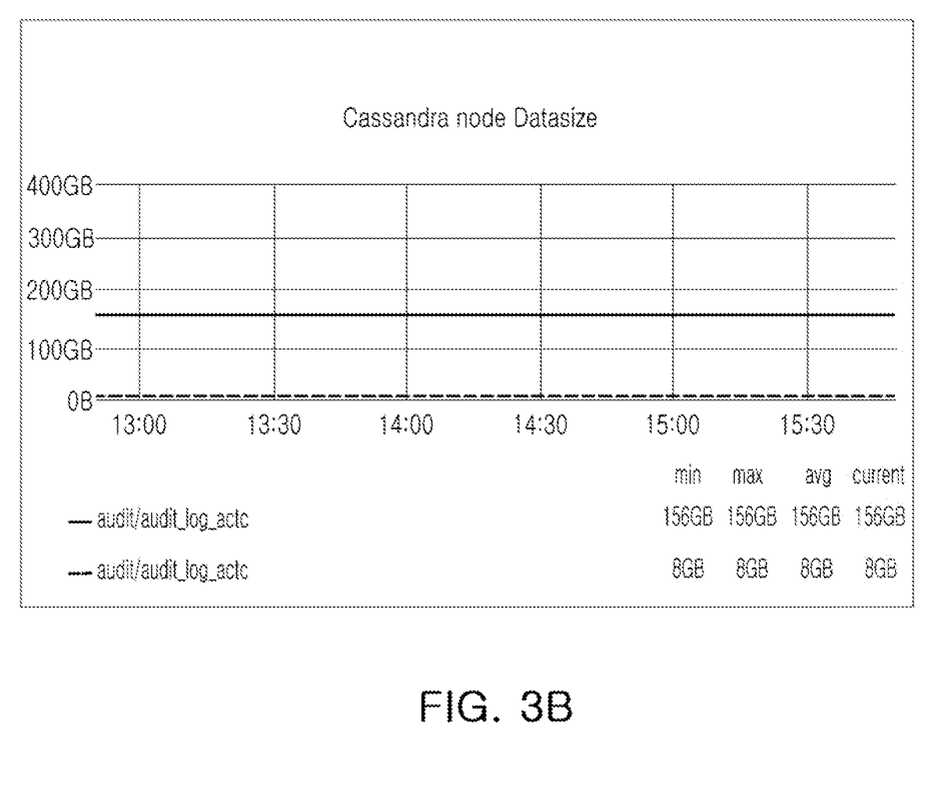
Figure 3C:
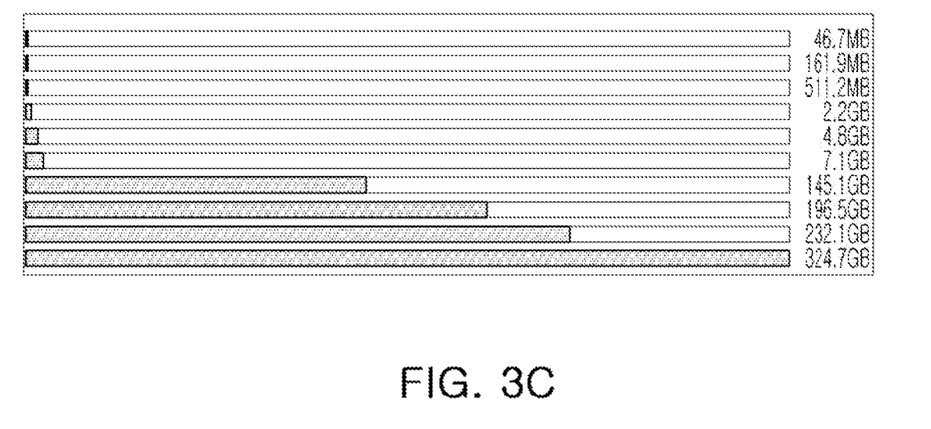

FIGS. 3A to 3C are diagrams illustrating monitoring results using Java Management eXtensions (JMX), an open Application Programming Interface (API), according to an embodiment.

Hereinafter, the system 100 for partitioning a keyspace according to an embodiment will be described with reference to FIGS. 1 and 3C.

The administrator terminal 110 is a terminal that transmits a keyspace creation request to the server 120, and for example, may be included in a smartphone, a mobile phone, a laptop computer, a digital broadcasting terminal, Personal Digital Assistants (PDA), a Portable Multimedia Player (PMP), a tablet PC, a desktop PC, and the like.

The above-described keyspace creation request may include a partition setting item. As the partition setting item, in addition to the existing replication factor, at least one of the size of the partition for storing data and the retention period of data may be further included.

In creating a keyspace, it is determined how many nodes to replicate the partition to, which is referred to a replication factor. For example, when the replication factor is set to 3, a partition may be replicated to two adjacent nodes.

In addition, as illustrated in FIG. 2, the keyspace is a data model including a plurality of tables, in which each table is comprised of a number of rows, and each row contains data (Column name, Column value).

On the other hand, the server 120 may include a control unit 121 and a monitoring unit 122.

When a request for creating a keyspace is received, the control unit 121 may transmit partition setting items included therein to the database 130.

In addition, the control unit 121 may request registration of the cloud service according to the event to the cloud service providing device 140 to be described later. Accordingly, the cloud service providing device 140 may store the cloud service requested for registration.

The above-described event may include first to third events.

In detail, the first event may be a case in which the frequency of access to data is lower than a preset frequency of access. The second event may be when the storage period of data has elapsed. Also, the third event may be a case in which data usage compared to the size of the partition is equal to or greater than a predetermined ratio.

In addition, the cloud service according to an event may include the following contents.

In detail, when the event is the first event, the cloud service may be a service providing a command to decrease the replication factor to the database 130.

In addition, when the event is the second event, the cloud service may be a service providing a command to delete data for which the retention period has elapsed to the database 130.

In addition, when the event is the third event, the cloud service may be a service providing a command to additionally create a partition for data storage to the database 130.

Although the first event, the second event, and the third event and the contents of the cloud service according to the first event, the second event, and the third event are specifically described in the disclosure, this is to help in an understanding of the disclosure, and various modifications may be made according to the needs of those skilled in the art.

In addition, the control unit 121 may transmit an event alarm including at least one of the first event, the second event, and the third event to the cloud service providing device 140 based on a monitoring result of the monitoring unit 122 to be described later. Thereafter, the cloud service providing device 140 may provide the cloud service according to at least one of the first event, the second event, and the third event to the database 130 in an event-triggered manner according to the event notification.

On the other hand, the monitoring unit 122 may monitor the access frequency of data stored in the partition and the size of data stored in the partition. Monitoring results may be transmitted to the above-described control unit 121.

According to an embodiment, the monitoring unit 122 may monitor using JMX. JMX may be an open API of Java.

FIGS. 3A to 3C illustrate monitoring results using JMX. For example, JMX may monitor the usage of the partitioned storage medium (disk), as illustrated in FIG. 3A. Alternatively, JMX may monitor the data size of each node as illustrated in FIG. 3B. Alternatively, as illustrated in FIG. 3C, JMX may compare and monitor the sizes of data for respective nodes (corresponding to the vertical axis).

On the other hand, the database 130 may include a control unit 131, an authentication unit 132, and a storage unit 133.

The control unit 131 may receive a partition setting item from the server 120, and create a partition for a keyspace in the storage unit 133 according to the received partition setting item.

In addition, the control unit 131 may manage partitions according to cloud services based on events provided from the cloud service providing device 140.

In detail, when the cloud service is a cloud service according to the first event, a preset replication factor may be reduced.

Alternatively, when the cloud service is a cloud service according to the second event, data for which the retention period has elapsed may be deleted.

Alternatively, when the cloud service is a cloud service according to the third event, a partition may be additionally created to store data.

On the other hand, the authentication unit 132 may be used to authenticate an administrator terminal.

For example, when the keyspace creation request transmitted from the administrator terminal includes administrator information, administrator information may be further included in the partition setting item. In this case, the authentication unit 132 may authenticate the authority of the administrator terminal 110 based on the administrator information.

The storage unit 133 is a high-capacity storage medium for storing data, and a partition for a key space is created in the storage space. Data may be stored in the structure illustrated in FIG. 2.

According to an embodiment, the above-described partition setting items may further include a keyspace name, a time stamp, and a storage period, and may be stored as a JavaScript Object Notation (JSON) file.

These JSON files may be used to retrieve partition setting items.

For example, when requesting a keyspace including an inquiry date from the server 120, the database 130 may search for a partition setting item having a storage period including the inquiry date, and transmit the searched partition setting item to the server 120.

Finally, the cloud service providing device 140 may include an event trigger 141 and a storage unit 142.

The event trigger 141 may store a cloud service according to an event requested for registration from the server 120, in the storage unit 142.

In detail, the cloud service may be a service providing a command for decreasing the replication factor to the database 130 when the event is the first event, and when the event is the second event, the cloud service may be a service providing a command to the database 130 to delete data for which the retention period has elapsed, and when the event is the third event, the cloud service may be a service providing a command to additionally create a partition for data storage to the database 130, as described above.

In addition, when the event trigger 141 receives an event notification from the server 120, with reference to the storage unit 142, the event trigger 141 may provide a cloud service according to at least one of the first event, the second event, and the third event to the database 130 in an event triggered manner.

As described above, according to an embodiment, by creating and managing partitions by adding at least one of the size of the partition for storing data and the retention period of data in addition to the existing replication factor as a partition setting item for the keyspace, storage capacity may be managed more efficiently than in the case of managing partitions by setting a replication factor of a fixed value in the related art.

In addition, according to an embodiment, a cloud service for processing events according to data access frequency, data storage period, and partition usage is registered in the cloud service providing device, and the cloud service is provided in an event-triggered manner. Therefore, the problem of the recommended storage capacity of the node may be resolved by allowing the database to reduce the replication factor, delete data of which retention period has elapsed, or create additional partitions.

Figure 4:
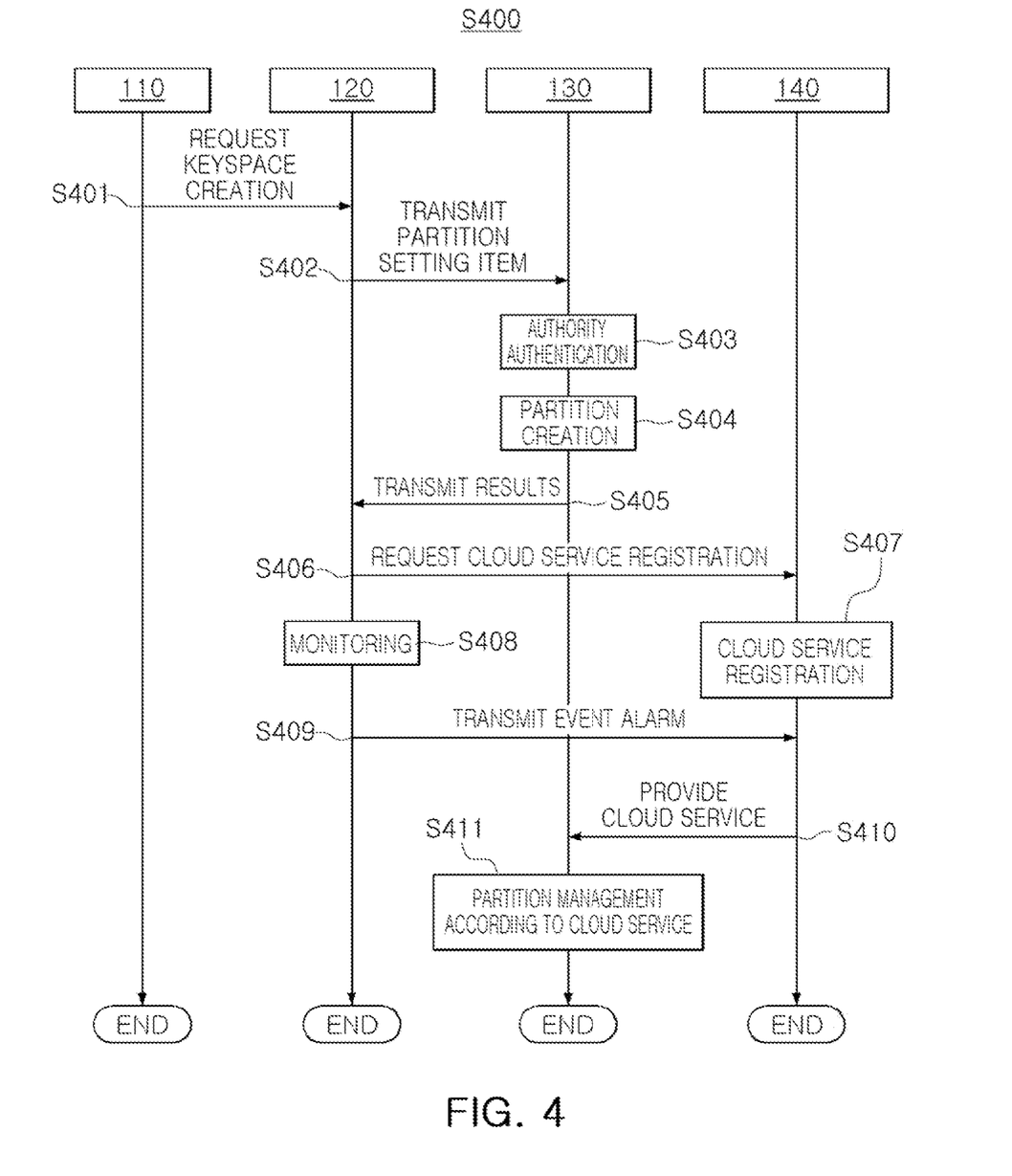
FIG. 4 is a flowchart illustrating a method of partitioning a keyspace according to an embodiment.

FIG. 4 is a flowchart illustrating a method of partitioning a keyspace according to an embodiment.

Hereinafter, a method of partitioning a keyspace according to an embodiment will be described with reference to FIGS. 1 to 4. However, for the sake of brevity of the disclosure, overlapping descriptions with FIGS. 1 to 3 will be omitted.

Referring to FIGS. 1 to 4, a method S400 of partitioning a keyspace according to an embodiment may start by transmitting a keyspace creation request from the administrator terminal 110 to the server 120 (S401).

The keyspace creation request may include a partition setting item. As described above, the partition setting item may further include at least one of the size of the partition for storing data and the storage period of data in addition to the existing replication factor.

Thereafter, the server 120 may transmit the partition setting item included in the keyspace creation request to the database 130 (S402).

Accordingly, the database 130 may create a partition for the keyspace according to the received partition setting item (S404) and transmit the result to the server 120 (S405).

Depending on an embodiment, when the keyspace creation request transmitted from the administrator terminal 110 includes administrator information, the administrator information may also be further included in partition setting items. In this case, it is as described above that the authentication unit 132 may authenticate the authority of the administrator terminal 110 based on the administrator information (S403).

Thereafter, the server 120 may request registration of the cloud service according to the event to the cloud service providing device 140 to be described later (S406). Accordingly, the cloud service providing device 140 may store the registration-requested cloud service (S407).

The above-described event may include the first event, the second event, and the third event.

In detail, the first event may be a case in which the frequency of access to data is lower than a preset frequency of access. The second event may be when the storage period of data has elapsed. Also, the third event may be a case in which data usage compared to the size of the partition is equal to or greater than a predetermined ratio.

In addition, the cloud service according to an event may include the following contents.

In detail, when the event is the first event, the cloud service may be a service providing a command to decrease the replication factor to the database 130.

In addition, when the event is the second event, the cloud service may be a service providing a command to delete data for which the retention period has elapsed to the database 130.

In addition, when the event is the third event, the cloud service may be a service providing a command to additionally create a partition to store data to the database 130 as described above.

Thereafter, the server 120 may monitor the access frequency of data stored in the partition and the size of data stored in the partition (S408). According to an embodiment, the monitoring unit 122 may monitor using JMX, and JMX may be an open API of Java as described above.

Then, the server 120 may transmit an event alarm including at least one of the first event, the second event, and the third event to the cloud service providing device 140 based on the monitoring result (S409).

Accordingly, the cloud service providing device 140 may provide the cloud service according to at least one of the first event, the second event, and the third event to the database 130 in an event-triggered manner according to the event notification (S410).

Then, the database 130 may manage the partition according to the cloud service according to the event provided from the cloud service providing device 140 (S411).

In detail, when the cloud service is a cloud service according to the first event, a preset replication factor may be reduced.

Alternatively, when the cloud service is a cloud service according to the second event, data for which the retention period has elapsed may be deleted.

Alternatively, when the cloud service is a cloud service according to the third event, it is as described above that a partition may be additionally created to store data.

As described above, according to an embodiment, a partition may be created and managed by adding at least one of the size of a partition for storing data and the storage period of data in addition to the existing replication factor as a partition setting item for a keyspace. Therefore, storage capacity may be managed more efficiently than in the case of managing partitions by setting a replication factor of a fixed value in the related art.

In addition, according to an embodiment of the disclosure, a cloud service for processing events according to data access frequency, data storage period, and partition usage may be registered in the cloud service providing device, and the corresponding cloud service may be provided in an event-triggered manner, thereby resolving the problem of the recommended storage capacity of the node by allowing the database to reduce the replication factor, delete data whose retention period has elapsed, or create additional partitions.

Figure 5:
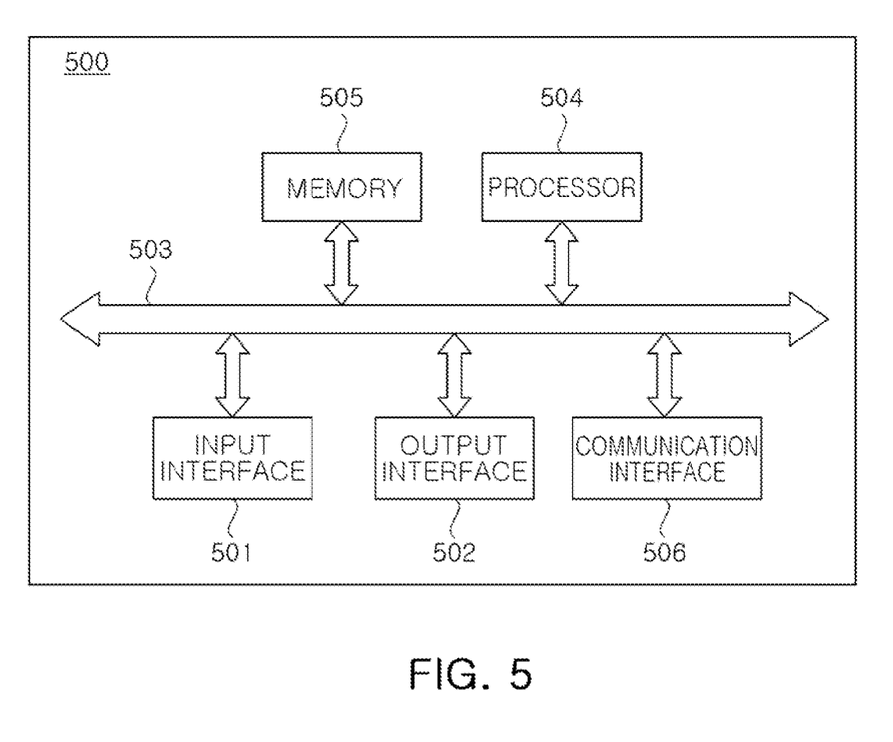
FIG. 5 is a block diagram of a computer device capable of implementing, in whole or in part, a system for partitioning a keyspace according to an embodiment.

On the other hand, FIG. 5 is a block diagram of a computer device that may fully or partially implement a system for partitioning a keyspace according to an embodiment, and may be applied to the respective devices 110, 120, 130, and 140 illustrated in FIG. 5.

As illustrated in FIG. 5, a computer device 500 may include an input interface 501, an output interface 502, a processor 504, a memory 505 and a communication interface 506, and the input interface 501, the output interface 502, the processor 504, the memory 505 and the communication interface 506 may be interconnected through a system bus 503.

In an embodiment, the memory 505 is used to store programs, instructions or code, and the processor 504 may execute a program, instructions or code stored in the memory 505, control the input interface 501 to receive a signal, and control the output interface 502 to transmit a signal. The aforementioned memory 505 may include read-only memory and random access memory, and may provide instructions and data to the processor 504.

In an embodiment, it should be understood that the processor 504 may be a central processing unit (CPU), and may be other general-purpose processors, digital signal processors (DSPs), application specific integrated circuits (ASICs), field programmable gate arrays (FPGAs) or other programmable logic devices, discrete gates or transistor logic device, individual hardware component, or the like. A general purpose processor may be a microprocessor, or the processor may be any related art processor or the like.

In one implementation process, the method performed in the system 100 of FIG. 1 may be obtained by an integrated logic circuit of hardware in the processor 504 or instructions in the form of software. The content of the method disclosed in relation to the embodiment may be completed by being performed by a hardware processor, or may be implemented to be performed and completed by a combination of hardware and software modules of a processor. The software module may be disposed in a storage medium such as random access memory, flash memory, read-only memory, programmable read-only memory or electrically erasable programmable memory, registers, or the like. The storage medium is located in the memory 505, and the processor 504 reads the information of the memory 505 and implements the contents of the above method in combination with hardware. To avoid duplication, detailed descriptions are omitted herein.

In addition, in describing the disclosure, '-unit' may be implemented in various manners, for example, by a processor, program instructions executed by the processor, software modules, microcodes, computer program products, logic circuits, application-specific integrated circuits, firmware, and the like.

As set forth above, according to an embodiment, as a partition setting item for a keyspace, in addition to the existing replication factor, at least one of the size of the partition for storing data and the storage period of data may be added to create and manage the partition, thereby efficiently managing storage capacity, as compared to the case of managing partitions by setting a replication factor of a fixed value in the related art.

In addition, according to an embodiment, a cloud service for processing events according to data access frequency, data storage period, and partition usage may be registered in the cloud service providing device, and the corresponding cloud service may be provided in an event-triggered manner. Therefore, the problem of the recommended storage capacity of a node may be resolved by allowing the database to reduce the replication factor, delete data of which retention period has elapsed, or create additional partitions.

While example embodiments have been illustrated and described above, it will be apparent to those skilled in the art that modifications and variations could be made without departing from the scope of the disclosure as defined by the appended claims.

What is claimed is:

1. A system for partitioning a keyspace, the system comprising:
   one or more processors; and
   a memory storing one or more programs,
   wherein the one or more programs are executed by the one or more processors, and
   the one or more programs include instructions for performing operations comprising:
   transmitting a partition setting item based on a keyspace creation request; and
   receiving, in a database, the partition setting item and creating a first partition for the keyspace based on the received partition setting item,
   wherein the partition setting item comprises a replication factor and at least one of a size of a second partition for storing data or a storage period of the data.

2. The system of claim 1, wherein the one or more programs further include instructions for performing operations further comprising requesting a registration of a cloud service based on an event to a cloud-service-providing device, and
   wherein the cloud-service-providing device stores the cloud service requested for the registration.

3. The system of claim 2, wherein, based on the event being a first event, in which a first access frequency is lower than a preset access frequency, the cloud service provides a first command for reducing the replication factor to the database,
   wherein, based on the event being a second event, in which the storage period of the data has elapsed, the cloud service is configure to provide a second command to delete the data for which the storage period has elapsed to the database, and
   wherein, based on the event being a third event, in which a data usage compared to the size of the partition is a predetermined ratio or more, the cloud service provides a third command to additionally create a third partition for storing the data to the database.

4. The system of claim 3, wherein the one or more programs further include instructions for performing operations further comprising:
   monitoring a second access frequency of the data stored in the partition and a magnitude of the data stored in the partition, and
   transmitting an event alarm comprising at least one of the first event, the second event, or the third event based on a monitoring result to the cloud-service-providing device.

5. The system of claim 4, wherein the cloud-service-providing device provides, based on the event alarm, the cloud service according to at least one of the first event, the second event, or the third event to the database in an event-triggered manner.

6. The system of claim 1, wherein the partition setting item further comprises a name of the keyspace, a time stamp, and a storage period, and
   wherein the partition setting item is stored as a JavaScript Object Notation (JSON) file.

7. A method of partitioning a keyspace, the method comprising:
   transmitting, in a server, a partition setting item based on a keyspace creation request; and
   receiving, in a database, the partition setting item and creating a first partition for the keyspace based on the received partition setting item,
   wherein the partition setting item comprises a replication factor and at least one of a size of a second partition for storing data or a storage period of the data.

8. The method of claim 7, further comprising:
   requesting, in the server, a registration of a cloud service based on an event to a cloud-service-providing device; and
   storing, in the cloud-service-providing device, the cloud service requested for the registration.

9. The method of claim 8, wherein, based on the event being a first event, in which a first access frequency is lower than a preset access frequency, the cloud service provides a first command for reducing the replication factor to the database,
   based on the event being a second event, in which the storage period of the data has elapsed, the cloud service provides a second command to delete the data for which the storage period has elapsed to the database, and based on the event being a third event, in which a data usage compared to the size of the partition is a predetermined ratio or more, the cloud service provides third command to additionally create a third partition for storing the data to the database.

10. The method of claim 9, further comprising:
monitoring, in the server, a second access frequency of the data stored in the partition and a magnitude of the data stored in the partition; and
transmitting, by the server, an event alarm comprising at least one of the first event, the second event, or the third event based on a result of the monitoring to the cloud-service-providing device.

11. The method of claim 10, further comprising:
providing, by the cloud-service-providing device based on the event alarm, the cloud service according to at least one of the first event, the second event, or the third event to the database in an event-triggered manner.

12. The method of claim 7, wherein the partition setting item further comprises a name of the keyspace, a time stamp, and a storage period, and
wherein the partition setting item is stored as a JavaScript Object Notation (JSON) file.

13. A non-transitory computer-readable recording medium storing computer program, which, when executable by at least one processor, causes the at least one processor to execute:
transmit, in a server, a partition setting item based on a keyspace creation request; and
receive, in a database, the partition setting item and create a first partition for a keyspace based on the received partition setting item,
wherein the partition setting item comprises a replication factor and at least one of a size of a second partition for storing data or a storage period of the data.

* * * * *

UNITED STATES PATENT AND TRADEMARK OFFICE
CERTIFICATE OF CORRECTION

| | | |
|---|---|---|
| PATENT NO. | : 12,326,848 B2 | Page 1 of 1 |
| APPLICATION NO. | : 18/384666 | |
| DATED | : June 10, 2025 | |
| INVENTOR(S) | : Jihun Song | |

It is certified that error appears in the above-identified patent and that said Letters Patent is hereby corrected as shown below:

On the Title Page

Item (30), please insert -- (30) Foreign Application Priority Data October 28, 2022 KR 10/2022/0141732 --

Signed and Sealed this
Second Day of September, 2025

Coke Morgan Stewart
*Acting Director of the United States Patent and Trademark Office*